United States Patent [19]

Hitachi et al.

[11] Patent Number: 5,163,291
[45] Date of Patent: Nov. 17, 1992

[54] METAL-MADE CARRIER BODY FOR EXHAUST GAS CLEANING CATALYST

[75] Inventors: Yuzo Hitachi; Haruo Serizawa, both of Shizuoka, Japan

[73] Assignee: Usui Kokusai Sangyo Kabushiki Kaisha, Japan

[21] Appl. No.: 712,994

[22] Filed: May 28, 1991

Related U.S. Application Data

[63] Continuation of Ser. No. 390,030, Aug. 7, 1989, abandoned.

[30] Foreign Application Priority Data

Aug. 13, 1988 [JP] Japan .............................. 63-106518[U]

[51] Int. Cl.⁵ .......................... F01N 3/28; B01J 35/04
[52] U.S. Cl. ..................... 60/299; 422/180; 502/527
[58] Field of Search .................... 60/299; 422/180; 502/527

[56] References Cited

U.S. PATENT DOCUMENTS

| | | | |
|---|---|---|---|
| 3,107,255 | 1/1962 | Norris | 422/180 |
| 3,770,389 | 10/1973 | Kitzner | 422/180 |
| 4,741,082 | 5/1988 | Kanniainen | 422/180 |
| 4,793,136 | 12/1988 | Whittenberger | 422/180 |
| 4,803,189 | 2/1989 | Swars | 502/527 |

FOREIGN PATENT DOCUMENTS

| | | |
|---|---|---|
| 3629945 | 10/1987 | Fed. Rep. of Germany ........ 60/299 |
| 2253826 | 10/1970 | Japan .................................. 422/180 |
| 13462 | 1/1979 | Japan . |
| 4373 | 1/1981 | Japan . |
| 1585 | 1/1982 | Japan . |
| 199574 | 9/1986 | Japan . |

Primary Examiner—Douglas Hart
Attorney, Agent, or Firm—Lowe, Price, LeBlanc & Becker

[57] ABSTRACT

A metal-made carrier body, for carrying thereon an exhaust gas cleaning catalyst, comprises a multi-layered composite body in a spirally rolled form composed of a sheet-like band and a corrugated band, the multi-layered composite body being enclosed in and fixed to a tubular metal casing. The metal casing is composed of an outer casing, and at least one inner casing disposed in the outer casing, thus giving excellent durability to the carrier body.

5 Claims, 1 Drawing Sheet

METAL-MADE CARRIER BODY FOR EXHAUST GAS CLEANING CATALYST

This application is a continuation Continuation-in-Part; Divisional application of application Ser. No. 07/390,030, filed Aug. 7, 1989, and now abandoned.

BACKGROUND OF THE INVENTION

1. Field of the Invention

The present invention relates to a metal-made carrier body, for carrying thereon an exhaust gas cleaning catalyst, which is generally provided as an exhaust gas cleaning means at an intermediate point of an exhaust system of an automobile.

More particularly, the invention relates to a metal-made carrier body for carrying thereon an exhaust gas cleaning catalyst, in which the individual components of the carrier body can perform their function without separation, breakage or other damage when used even in severe environments.

2. Description of the Related Art

Conventional metal-made carrier bodies of the above sort, which are adapted to carry an exhaust gas cleaning catalyst thereon, include those having a structure formed by laminating at least one sheet-like metal band and at least one corrugated metal band in layers or rolling them together into a multi-layered composite body with a view toward increasing the carrying area per unit volume, namely, with a view toward increasing as much as possible the effective area of contact between exhaust gas and the exhaust gas cleaning catalyst per unit volume and further reducing the weight of the metal-made carrier body to a maximum possible extent.

For example, a sheet-like metal band made of a heat-resistant thin sheet of Fe-Cr steel having a thickness of 0.1 mm or smaller and a corrugated band made from another thin metal sheet of the same type are superposed one over the other to have areas of contact therebetween. They are then rolled together spirally into a multi-layered composite body defining many network-patterned gas flow passages along a central axis thereof for allowing exhaust gas to pass therethrough. The multi-layered composite body is enclosed within a tubular metal casing which has a single-layer structure and opens in opposite ends thereof. The members of the multi-layered composite body, i.e., the sheet-like band and corrugated band are put together into a vibration-proof structure. Namely, the sheet-like band and corrugated band as well as the multi-layered composite body thus rolled and the metal casing are put together at the areas of contact therebetween by welding, brazing or the like. These joining means at the areas of contact between the multi-layered composite body and the metal casing are exemplified by the following:

(i) Electron beam welding, laser beam welding, arc welding, etc. as disclosed in Japanese Patent Laid-Open Publication No. 13462/1979 and Japanese Patent Laid-Open Publication No. 1585/1982, for example.

(ii) Brazing, as disclosed in Japanese Patent Laid-Open Publication No. 4373/1981. This brazing includes applying a paste of binder and brazing material (or applying a powdery brazing material after painting a binder, or applying a sheet of brazing material) over a desired portion of at least one of the two members, i.e. the sheet-like band and the corrugated band, then rolling or laminating these two members together to provide a multi-layered composite body, and finally heating around the above-mentioned portion of the multi-layered composite body.

(iii) Brazing, as disclosed in Japanese Patent Laid-Open Publication No. 199574/1986 (division of Japanese Patent Laid-Open Publication No. 4373/1981). This brazing includes rolling or laminating the sheet-like band and the corrugated band together to provide a multi-layered composite body, then applying a brazing material to the ends of the multi-layered composite body such as by painting or spraying, and finally heating around the ends of the multi-layered composite body.

(iv) Another brazing includes electroplating or electroless-plating to form a coating of brazing material on the surfaces of the sheet-like and corrugated bands before or after the sheet-like and corrugated bands are shaped into a multi-layered composite body, and then heating the coated surfaces.

The above conventional joining means cause the following production and quality problems:

With the joining method of (i) above, spot-welding must take place at narrow areas of contact or interior areas of contact, which is laborious and time-consuming and hence causes only an inadequate degree of vibration-proofness. Further, electron beam welding and laser beam welding require special and expensive equipments. This would necessarily result in a reduced rate of production.

In the joining method of (ii) above, it is necessary to use an expensive brazing material such as nickel, and the way of applying and drying the brazing material is complex and laborious. As the multi-layered composite body, in which the the sheet-like and corrugated bands are rolled together and in which the brazing material is applied only to the restricted areas, is enclosed in a tubular metal casing and is brazed at the restricted areas of contact between the sheet-like and corrugated bands by heating, the multi-layered composite body would vary in size so that the roll becomes loose to create gaps at the areas of contact. This is partly because a part of the brazing-material coating is melted to flow out from the areas of contact between the sheet-like and corrugated bands when heated, and partly because the sheet-like and corrugated bands are rolled in layers to accumulate the loosed amount. Thus adequate vibration-proofness is difficult to achieve. Further, during the heat-treatment as well as when the metal-made carrier body of this type is installed in the exhaust system of an automobile, it is highly likely that gaps be formed due to the high temperature of the exhaust gas with the lapse of time.

Also with the joining method of (iv) above, it is impossible to join the sheet-like and corrugated bands with adequate firmness. Therefore adequate vibration-proofness cannot be achieved.

In the joining methods of (iii) and (iv) above, it is impossible to join the sheet-like and corrugated bands especially centrally of the metal-made carrier body, and the application of the brazing material and the plating require laborious work, as described above in connection with (ii) above. Further, because an expensive vacuum furnace is used, the joining method of each of (ii), (iii) and (iv) is not economical with a view to their running costs.

In the above-mentioned conventional production of the metal-made carrier body for an exhaust gas cleaning catalyst, there was a limit in preventing the constituent members of the carrier body from any separation.

Further, the metal-made carrier body of this type is used in severe thermal environments and hence requires adequate durability against any breakage, cracking or separation of the members making up the the carrier body. In the exhaust system of an automobile, the members of the carrier body are subjected to strains (hereinafter called "thermal strains") due to the large difference between their coefficients of thermal expansion (volume expansion and linear expansion) under the severe cooling and heating cycle of from −20° C. to 900° C. These members are also subjected to vibrations from the automobile body. As a result, the members would be separated, cracked or otherwise damaged.

SUMMARY OF THE INVENTION

It is therefore an object of the present invention to provide a metal-made carrier body, for carrying thereon an exhaust gas cleaning catalyst, in which the constituent members of the carrier body can be prevented from any separation or cracking.

According to the present invention, there is provided a metal-made carrier body for carrying thereon an exhaust gas cleaning catalyst, the carrier body being formed by superposing a sheet-like metal band made of a thin metal sheet and a corrugated band made from another thin metal sheet one over the other in a contiguous relation into a multi-layered composite body of a spiral form defining many network-parterned gas flow passages along the central axis thereof, and then enclosing the multi-layered composite body in a tubular metal casing, characterized in that the tubular metal casing is composed of an outer casing and at least one inner casing disposed in the outer casing, the multi-layered composite body being enclosed in each of the outer and inner casings.

The above and other objects, features and additional advantages of the present invention will become manifest to those versed in the art upon making reference to the detailed description and the accompanying drawings in which a couple of structural embodiments incorporating the principles of the present invention by way of illustrative example.

DETAILED DESCRIPTION OF THE PREFERRED EMBODIMENTS

Figure 1:
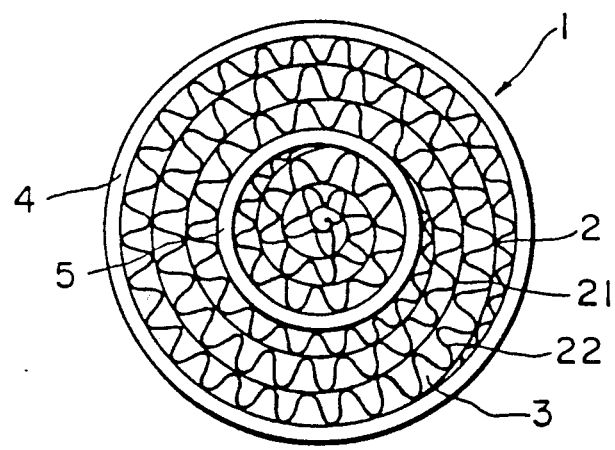
FIG. 1 is an end elevational view of a metal-made carrier body, for an exhaust gas cleaning catalyst, embodying the present invention.

FIG. 1 illustrates a metal-made carrier body 1, for carrying thereon an exhaust gas cleaning catalyst, embodying the present invention. The metal-made carrier body 1 is constructed in the following manner. A multi-layered composite body 2 is composed a sheet-like band 21 made of a heat-resistant thin metal sheet, and a corrugated band 22 made from another thin metal sheet of the same type, the sheet-like and corrugated bands 21, 22 being rolled together into a spiral form. Then, the multi-layered composite body 2 is enclosed in an outer casing 4, i.e. the outermost husk, and also in an inner casing 5 disposed in the outer casing 4. The multi-layered composite body 2 defines many network-patterned gas flow passages 3 which would not so cause a pressure loss of exhaust gas. These constituent members of the metal-made carrier body 1 may be joined together in an arbitrary joining means such as brazing.

The significant feature of the present invention resides in that the multi-layered composite body 2 is enclosed not only in the outer casing 4 but also in the inner casing 5.

With the metal-made carrier body 1 thus constructed, it is possible to prevent separation of the constituent members due to thermal strains and cracking due to vibration, even under severe conditions such as at a high temperation of 800° C. to 900° C. in the exhaust gas system of an automobile or under the severe cooling and heating cycle (heat alteration load) of −20° C. to 900° C.

Thus, unlike the conventional art in which the multi-layered composite body enclosed in and fixedly joined to only the outer casing, the multi-layered composite body 2 of the present invention is divided radially of the roll of the sheet-like and corrugated bands 21, 22 by the inner casing 5. As a result, thermal strains can be divided radially of the roll and hence can be effectively prevented from creating a large deformation stress. Further, since the inner casing 5 is forced against the multi-layered composite body 2 in the outer casing 4 so as to increase the diameter of the hollow central portion of the roll, the sheet-like band 21 and the corrugated band 22 can be joined at the areas of contact with increased firmness.

Figure 2:
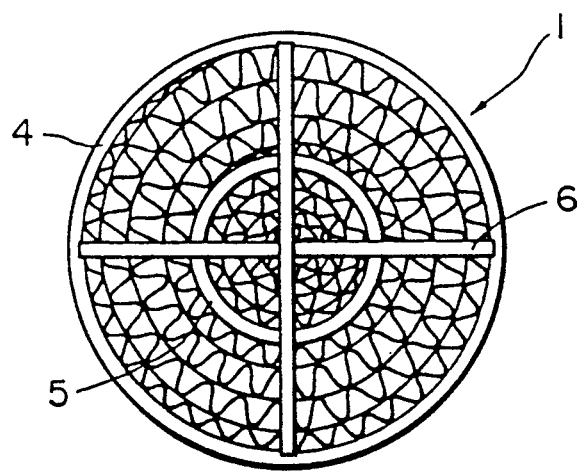
FIG. 2 is a view similar to FIG. 2, showing a modified form of the metal-made carrier body.

According to the present invention, it is possible to give adequate durability to the metal-made carrier body 1 of FIG. 1 simply by joining the contact portions between the sheet-like and corrugated bands 21, 22 and between the multi-layered composite body 2 and the outer and inner casings 4, 5 by an arbitrary means such as brazing. Further, as shown in FIG. 2, at least one end of the outer casing 4 may be provided with one or more ribs 6 for preventing the multi-layered composite body 2 from projecting from the casing end and for reinforcing the entire carrier body 1.

Further, between the multi-layered composite body in the outer casing 4 and that in the inner casing 5, it may be different in the pitch of the ridges (or the inter-ridge grooves) of the corrugated band 22, and thin metal sheets different in heat-resistance and corrosion-proofness may be used for the sheet-like and corrugated bands 21, 22. More particularly, with a view to the fact that exhaust gas flows faster at the central portion of an exhaust gas system and that the heat of reaction of exhaust gas and a catalyst is higher at the central portion of an exhaust gas system, it is preferable to use a corrugated band having a smaller inter-ridge pitch for the multi-layered composite body enclosed in the inner casing 5 and also to use thin metal sheets having good heat-resistance and corrosion-proofness for both the sheet-like and corrugated bands 21, 22. With this arrangement, since the centrally faster exhaust gas flow contacts the catalyst layer having an adequate area of contact, it is possible to clean exhaust gas with improved efficiency. Further, since thin metal sheets having good heat-resistance and corrosion-proofness are used for both the sheet-like and corrugated bands 21, 22, it is possible to improve the durability of the metal-made carrier body.

For example, the constituent members of the multi-layered composite body in the inner casing 5 may be more heat-resistant than those in the outer casing 4 in the following manner. The multi-layered composite body in the inner casing 5 is made of a heat-resistant steel containing 20% by weight of chromium, 6% by weight of aluminum, 0.1% by weight of yttrium and the rest of iron, while that in the outer casing 4 is made of a heat-resistant steel containing 20% by weight of chromium, 5% by weight of aluminum and the rest of iron. The resulting metal-made carrier body can effectively resist to the high exothermic reaction of exhaust gas and an exhaust gas cleaning catalyst which reaction may occur at the central portion of the carrier body.

The present invention is not limited to the illustrated specific embodiments. For example, two or more inner casings may be used, and various other changes or modifications to the inner casings may be made as desired.

With the metal-made carrier body of the present invention, it is possible to effectively prevent any separation between the constituent members of the carrier body, especially between the sheet-like and corrugated bands. Cracking (breakage) of the sheet-like and corrugated also can be effectively prevented. As a consequence, the catalyst layer carried on the surface of the sheet-like and corrugated bands can be held there for a long period of time, thus guaranteeing a stable exhaust-gas-cleaning function of the metal-made carrier body for a long period of time.

The present invention will now be described more in detail by the following examples. It should be noted that the present invention is not limited to these illustrated examples.

EXAMPLE 1:

(i) Sheet-like Band

A heat-resistant steel sheet containing 20% by weight of chromium and 5% by weight of aluminum and having a thickness of 0.05 mm and a width of 70 mm was used as a sheet-like band.

(ii) Corrugated Band

Another steel sheet of the same kind as the sheet-like band was shaped into a wavy form with longitudinal ridges having a height of 1.8 mm and spaced at pitches of 3.5 mm.

Then the sheet-like band and the corrugated band were superposed one over the other, whereupon these two bands were rolled together into a spiral form to provide a multi-layered composite body. The resulting multi-layered composite body was forcedly enclosed in an inner tubular metal casing having an inside diameter of about 30 mm and an outside diameter of 32 mm.

Meanwhile, with the sheet-like and corrugated bands of the above kind superposed one over the other, one end of the sheet-like band was fixed to a slit of a guide rod (serving to assist in rolling the supperposed bands), whereupon these two bands were rolled together to provide another multi-layered composite body having a diameter of 31.5 mm. The resulting multi-layered composite body was enclosed in an outer tubular metal casing having an inside diameter of 70 mm.

subsequently, the first-mentioned multi-layered composite body was forcedly enclosed in the central hollow portion (having an outside diameter of 31.5 mm) of the outer metal casing, and the last-mentioned multi-layered composite body was forcedly enclosed in the inner metal casing (having an outside diameter of 32 mm). After application of a brazing material, brazing was made at the areas of contact between the sheet-like and corrugated bands and also between the multi-layered composite body and the respective metal casing by heat-treatment. As a result, a metal-made carrier body for an exhaust gas cleaning catalyst was obtained. This carrier body was excellent in resistance to thermal strains and in vibration-proofness.

EXAMPLE 2

(i) Multi-layered composite body enclosed in inner casing

A sheet-like band of heat-resistant and corrosion-proofing steel containing 20% by weight of chromium, 6% by weight of aluminium, 0.1% by weight of yttrium and the rest of iron and having a thickness of 0.05 mm and a width of 100 mm, and a corrugated band made from another sheet-like band of the same kind and having longitudinal ridges of a 2.5 mm pitch and a 1.2 mm height, were rolled together into a spiral form to provide a multi-layered composite body. The resulting multi-layered composite body was forcedly enclosed in a tubular metal casing (inner casing) having an inside diameter of 50 mm and an outside diameter of 52 mm.

(ii) Multi-layered composite body enclosed in outer casing

A sheet-like band os heat-resistance and corrosion-proofing steel containing 20% by weight of chromium, 5% by weight of aluminum and the rest of iron and having a thickness of 0.05 mm and a width of 100 mm, and a corrugated band made from another sheet-like band of the same kind and having longitudinal ridges of a 3.5 mm pitch and a 1.8 mm height, were rolled together into a spiral form to provide another multi-layered composite body having a hollow portion of a 51 mm inside diameter. The resulting multi-layered composite body was forcedly enclosed in another metal casing (outer casing) having an inside diameter of 97 mm and an outside diameter of 100 mm.

Then the last-mentioned multi-layered composite body (i) enclosed in the outer casing was forcedly enclosed in the central hollow portion of the first-mentioned multi-layered composite body (ii) enclosed in the inner casing to provide a metal-made carrier body. A cross-shaped rib made of heat-resistant and corrosion-proofing steel containing 20% by weight of chromium, 5% by weight of aluminum and the rest of iron was formed at either open end of the outer casing. Subsequently brazing was made in the same manner as in Example 1.

As a result, the metal-made carrier body was excellent in resistance to thermal strains and in vibration-proofness. Further, the multi-layered composite body enclosed in the inner casing showed itself to be excellent in heat-resistance and corrosion-proofness.

What is claimed is:

1. A metal-made carrier body for carrying thereon an exhaust gas cleaning catalyst, said carrier body comprising a first portion and a second portion with each portion being formed by superposing a sheet-like metal band made of a thin metal sheet and a corrugated band made from another thin metal sheet one over the other in a contiguous relationship into a multi-layered composite body of a spiral form defining many network-patterned gas flow passages along the central axis thereof and providing areas of contact between said sheet-like metal band and said corrugated band, and then enclosing said multi-layered composite body in a tubular metal casing wherein said tubular metal casing is composed of an outer casing having opposed open ends and at least one inner casing having opposed open ends disposed in said outer casing so that adjacent opposed open ends of said outer casing and said inner casing are disposed in substantially common planes, one of said first and second portions of said multi-layered composite body being enclosed in said inner casing and the other of said first and second portions of said multi-layered composite body being positioned between said outer casing and said inner casing.

2. A metal-made carrier body according to claim 1, wherein said inner casing has a sufficient outside diameter so as to press against the portion of the multi-layered composite body between said inner casing and said outer casing and thereby increase the diameter of a central hollow portion of said multi-layered composite body enclosed between said inner casing and said outer casing.

3. A metal-made carrier body according to claim 1, wherein said corrugated band of said multi-layered composite body enclosed in said inner casing has an inter-ridge pitch which is smaller than the inter-ridge pitch of said corrugated band of said multi-layered composite body positioned between said outer casing and said inner casing.

4. A metal-made carrier body according to claim 1, wherein said sheet-like metal band and said corrugated band of said multi-layered composite body enclosed in said inner casing are more heat-resistant and corrosion-proof than said sheet-like metal band and said corrugated band of said multi-layered body positioned between said outer casing and said inner casing.

5. A metal-made carrier body according to claim 1, wherein at least one end of said outer casing is provided with at least one rib.

* * * * *